Dec. 5, 1967 W. H. FLARITY 3,356,950

PHASE COMPARISON RADIO RECEIVER

Filed Jan. 14, 1964 5 Sheets-Sheet 1

INVENTOR.
WARREN H. FLARITY
BY Knox & Knox

INVENTOR.
WARREN H. FLARITY
BY *Knox & Knox*

Dec. 5, 1967

W. H. FLARITY 3,356,950

PHASE COMPARISON RADIO RECEIVER

Filed Jan. 14, 1964

5 Sheets-Sheet 3

INVENTOR.
WARREN H. FLARITY
BY
Knox & Knox

Dec. 5, 1967

W. H. FLARITY 3,356,950

PHASE COMPARISON RADIO RECEIVER

Filed Jan. 14, 1964

5 Sheets-Sheet 4

INVENTOR.
WARREN H. FLARITY
BY Knox & Knox

INVENTOR.
WARREN H. FLARITY
BY Knox & Knox

United States Patent Office 3,356,950
Patented Dec. 5, 1967

3,356,950

PHASE COMPARISON RADIO RECEIVER

Warren H. Flarity, La Jolla, Calif., assignor to The Ryan Aeronautical Co., San Diego, Calif.

Filed Jan. 14, 1964, Ser. No. 337,590
15 Claims. (Cl. 325—420)

ABSTRACT OF THE DISCLOSURE

This invention relates to a radio receiver that receives a plurality of successive signals having the same frequency but with different phases, that uses one of said signals as the reference phase to determine successively the relative phase differences of the other signals, and that records in categories the phase differences of the other signals to establish by the distance of wavelengths a position relative to the location of the transmitters of the signals.

Radio signals propagated by a radio transmitter have a specific wavelength measured in linear units, such as meters or miles. Consequently, the distance between a radio transmitter station and a radio receiver station may be expressed as a number of wavelengths at the wavelength of the propagated signal or in linear units. Signals propagated from two spaced radio transmitter stations on the same wavelength arriving at a point an integral number of half wavelengths from both stations are in phase. If the point is less than an integral number of half wavelengths from one or both of the stations, the signals are out of phase. These wavelengths and phase characteristics may be used for fixing a receiver station position relative to two or more known transmitter station positions.

In a typical position indicating system, three radio transmitter stations transmitting in sequence at spaced intervals on the same wavelength are positioned a considerable distance apart in a triangle so that receiver stations within the triangle may receive signals from all three stations. One of the stations operates as a master station to control the emitted signal phase of the two so-called slave stations. Each station alternately transmits a signal in this known phase domain.

The typical system also includes charts having printed thereon hyperbolic lines between the master station and each slave station, each line being spaced at half wave or equal phase intervals. Consequently, each line indicates an equal phase line of position and the intersection of a pair of such lines indicates an equal phase point. Also, since the hyperbolic lines are drawn relative to known positions of the transmitter stations, an equal phase point represents a known position. Additionally, out of phase points between the half wave lines may be determined by interpolation as indicated by the measured phase difference between the master station and slave station signals.

The instant invention is a receiver designed to receive signals in the system as above described, compare and measure the relative phase of said signals, and convert the relative phase data into position information, said position information being continuously variable with changing position.

*Objects*

It is a principal object of this invention to provide a radio receiver capable of measuring the phase difference between a selected input signal and a plurality of other input signals.

It is another object of this invention to provide a radio receiver capable of receiving a series of discrete signals having different magnitude and phase and converting said signals to signals having a different frequency and equal magnitude, while maintaining the same relative phase difference as received.

It is still another object of this invention to provide a radio receiver including local oscillator means capable of producing a reference signal and a beat signal of different frequencies and combining said beat signal with input signals to produce control signals at the same frequency as said reference signal.

It is yet another object of this invention to provide a radio receiver including a method for measuring the phase difference between input signals, said method combining a locally generated reference signal 90 degrees out of phase with a selected input signal and measuring the phase of other input signals relative to the phase of said selected input signal.

It is a further object of this invention to provide a radio receiver including automatic frequency control means capable of tuning a local oscillator to the exact frequency necessary for maintaining a reference signal derived from said oscillator exactly 90 degrees out of phase with a selected input signal.

It is still a further object of this invention to provide a radio receiver including sequential means for selecting desired signals from a plurality of input signals.

It is another object of this invention to provide a radio receiver including means for storing the average voltage of selected input signals and novel means for reducing the stored voltage to zero magnitude between input signals.

It is still another object of this invention to provide a radio receiver including means for indicating visually when a selected input signal is 90 degrees out of phase with a locally generated reference signal and other input signals are received in proper sequence.

It is a further object of this invention to provide a radio receiver including a novel phase detector capable of rejecting the magnitude characteristic of input signals and having an output regardless of the relative phase of a locally generated reference signal and a plurality of input signals.

With these and other objects definitely in view, this invention consists in the novel combination and arrangement of elements as will be hereinafter fully described in the specification, particularly pointed out in the claims, and illustrated in the drawings that form a material part of this disclosure, and in which:

Similar characters of reference indicate similar or identical elements and portions throughout the specification and the views of the drawing.

*General description*

Figure 1:
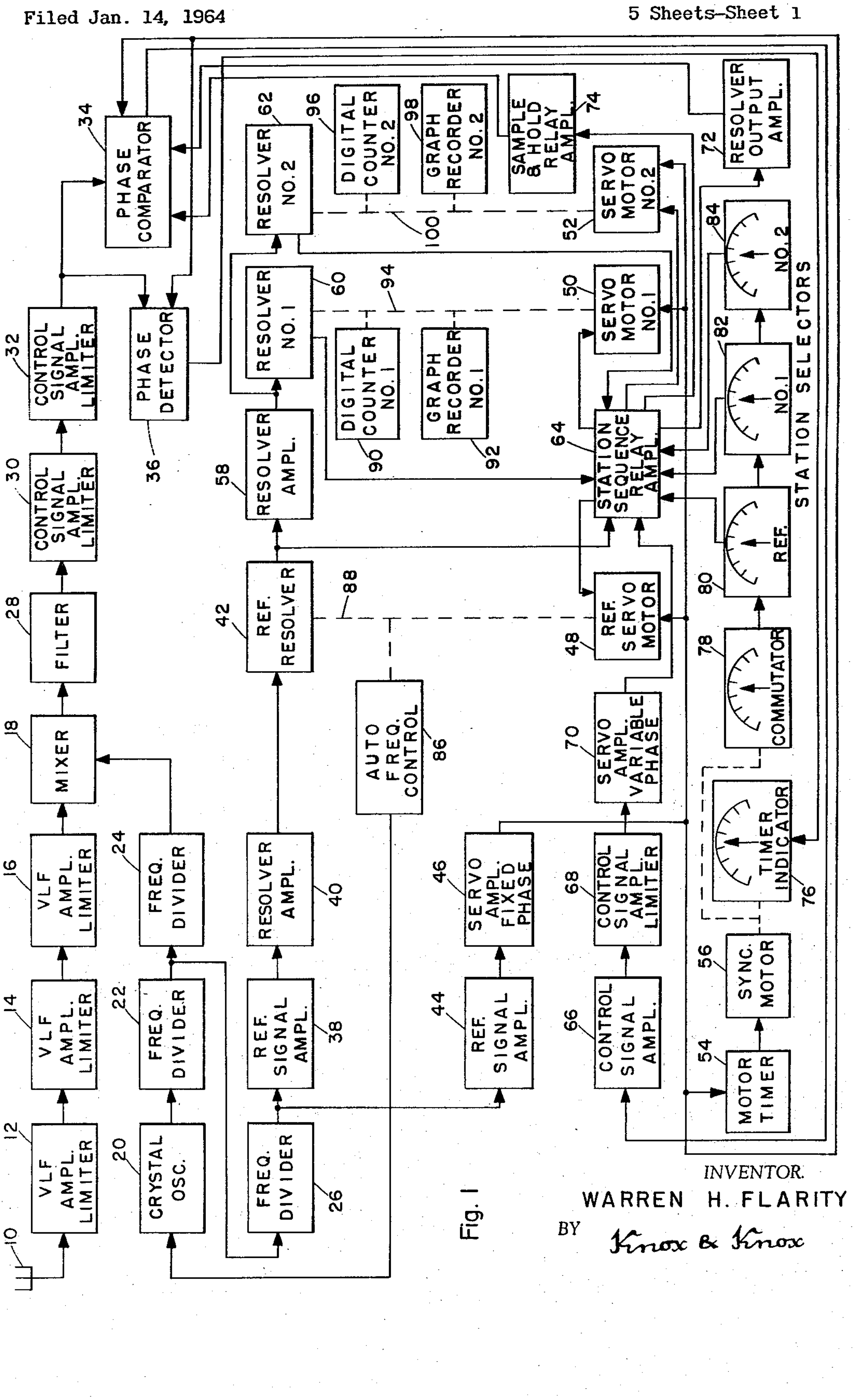
FIGURE 1 is a functional block diagram of the receiver system.

Elements of the complete phase comparison radio receiver system are shown functionally in FIGURE 1. Input signals received by antenna 10 are progressively amplified and limited by amplifier-limiters 12–16 and fed to mixer 18 at equal amplitude with the same relative phase as when received. Progressive amplifying and limiting provides a progressively narrowed bandwidth, which, provides high selectivity and elimination of static, other external noise, and signals outside the narrow bandwidth. Limiting also suppresses sustained oscillations in the tuned circuits and eliminates ringing.

The frequency of crystal oscillator 20 is selected in the medium frequency range for inherently stable operation. Maximum frequency stability is provided by regulated voltage and a constant temperature oscillator cabinet, not shown. The output of oscillator 20 is converted to a lower frequency by frequency divider 22; then to a lower frequency beat signal by frequency divider 24, and to a still lower frequency reference signal by frequency divider 26.

The beat signal is fed from frequency divider 24 to mixer 18 and heterodyned with input signals from amplifier-limiter 16 to provide control signals at the output of filter 28 at the same frequency as the reference signal output of frequency divider 26. The frequency of the reference signal and the control signals is in a range found suitable for driving servo motors, exciting resolvers, and the like.

Control signal amplifier-limiters 30 and 32 progressively amplify and limit the control signals and feed the control signals to phase comparator 34 and phase detector 36 at equal amplitude and with the same relative phase as the input signals received by antenna 10.

The reference signal from frequency divider 26 is fed through reference signal amplifier 38 and resolver amplifier 40 to reference resolver 42, where it is used to establish a selected control signal as the reference control signal for phase measurement of other selected control signals. The reference signal is further fed from frequency divider 26 through reference signal amplifier 44 and fixed phase servo amplifier 46 to one phase of two-phase servo motors 48–52, through motor timer 54 to drive synchronous motor 56 at constant speed, to phase comparator 34 for producing an output at the exact frequency of the reference signal, and to phase detector 36 for comparison with all input control signals.

The output of reference resolver 42 is fed through resolver amplifier 58 to resolvers 60 and 62 as a reference for phase measurement and through station sequence relay amplifier 64 to phase comparator 34 as hereinafter described for comparison with the selected reference control signal.

The output of phase comparator 34 is fed through control signal amplifier 66, control signal amplifier-limiter 68, variable phase servo amplifier 70 and station sequence relay amplifier 64 as hereinafter described to the other phase of two-phase servo motors 48–52 to drive said servo motors in combination with the reference signal fixed phase excitation.

The outputs of resolvers 60 and 62 are fed through station sequence relay amplifier 64 as hereinafter described to phase comparator 34 for comparison with the selected control signals.

The outputs of station sequence relay amplifier 64 derived from phase comparator 34 are fed to servo motors 48–52 as above described. The outputs from station sequence relay amplifier 64 derived from said resolvers as above described are fed through resolver-output amplifier 72 to phase comparator 34. An additional output from station sequence relay amplifier 64 is fed through sample and hold relay amplifier 74 to phase comparator 34 to enable said phase comparator during control signal input intervals and disable said phase comparator between input intervals for a purpose described hereinafter.

The output of phase detector 36 is fed to control signal timer indicator 76 to illuminate sequental indicators therein during control signal input intervals.

Synchronous motor 56 is mechanically connected to timer indicator 76 and station sequence commutator 78 to rotate said timer indicator and said commutator in synchronism with the periodic interval and periodic sequence of the input control signals.

Figure 6:
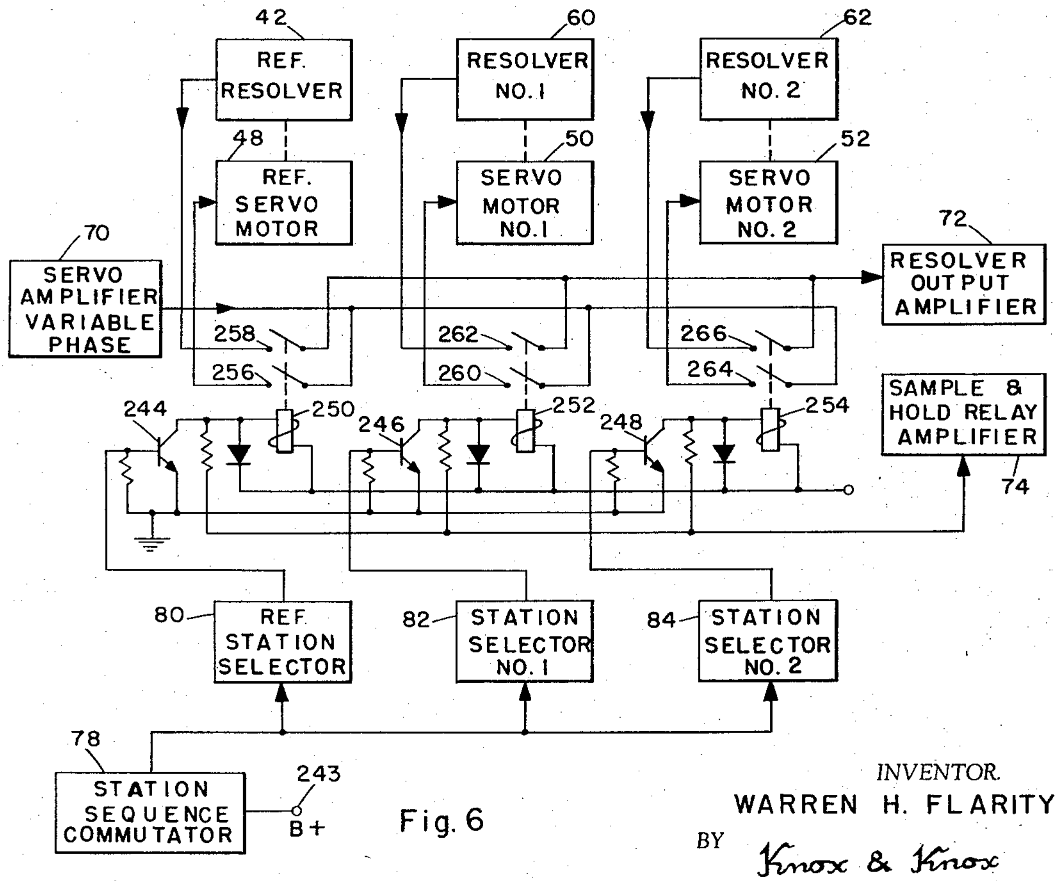
FIGURE 6 is a schematic and block diagram of the station sequence relay amplifier and selector circuit.

The electrical input to commutator 78 is a DC source, shown in FIGURE 6. The output of commutator 78 is fed through station selectors 80–84 to station sequence relay amplifier 64 to activate relays therein.

Automatic frequency control circuit 86 is mechanically connected to shaft 88. Circuit 86 feeds a tuning voltage back to crystal oscillator 20, said voltage being dependent on shaft 88 position to provide a frequency and phase compensating loop as hereinafter described.

Digital counter 90 and graph recorder 92 are mechanically connected to shaft 94. Digital counter 96 and graph recorder 98 are mechanically connected to shaft 100. Said counters and said recorders indicate relative phase and record phase deviation as a function of shaft position.

Assuming a plurality of discrete signals are received at periodic intervals in a periodic sequence on the single frequency to which amplifier-limiters 12–16 are tuned, all these signals are converted to control signals at the same frequency as the locally generated reference signal, and are fed to phase comparator 34 and phase detector 36 as above described.

Figure 8:
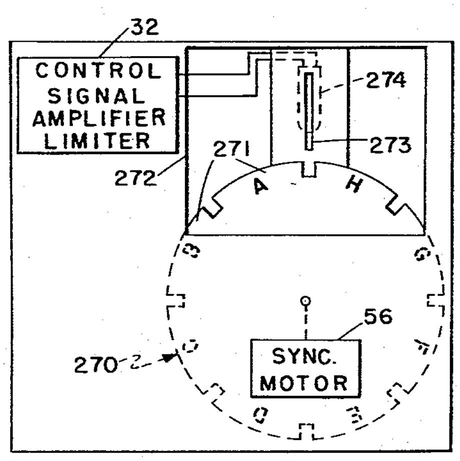
FIGURE 8 shows a visual timer indicating device.
Figure 9:
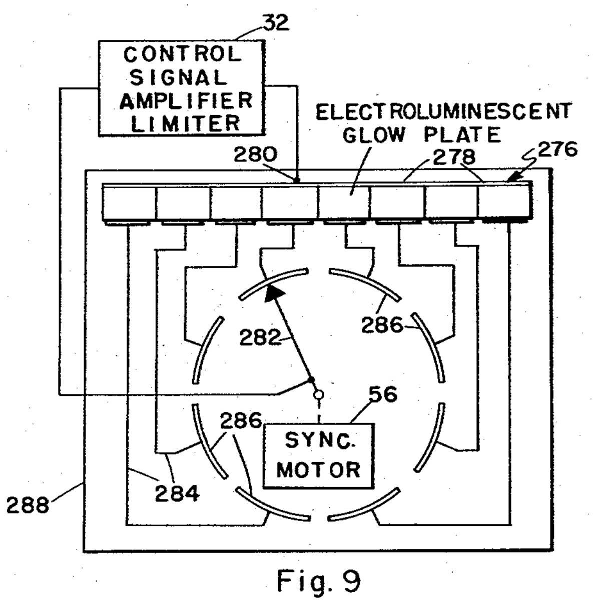
FIGURE 9 shows another embodiment of a visual timer indicating device.

Elements 54, 56, 64, and 76–84 provide means for selecting certain ones of said control signals, one as a reference control signal, the others for phase measurement thereof relative to the reference control signal. Motor timer 54 includes means for timing station sequence commutator 78. This means may be a pushbutton switch momentarily interrupting the applied reference signal voltage to synchronous motor 56. Control signal timer indicator 76 may be a mechanical or electroluminescent device including a number of separate segments as illustrated in FIGURES 1, 8, and 9. Station sequence commutator 78 includes a number of segments corresponding to the number and relative position of the segments in timer indicator 76 and a moving arm connected to a DC source. Each segment of commutator 78 is designed to maintain contact with said moving arm for the duration of each control signal, and each segment of indicator 76 is designed to indicate presence of said control signal for said duration. Each of station selectors 80–84 includes a manually operated rotary switch, each switch having a plurality of fixed contacts connected in parallel with commutator 78 segments and a moving arm connected to drive a transistor into conduction and energize a relay in station sequence relay amplifier 64 as shown in FIGURE 6. These relays are energized sequentially at periodic intervals by commutator 78 to close a comparator-motor-resolver-comparator loop coincidentally with reception of the selected control signals, and accomplish the aforesaid phase measurements during each periodic interval.

Initially, the desired reference control signal is selected by placing reference station selector 80 at the position corresponding to the interval in the prescribed sequence during which said signal is received by phase comparator 34. Also, station selectors 82 and 84 are placed at the positions corresponding to the intervals of the control signals to be measured relative to the reference control signal.

Next, rotation of synchronous motor 56 is regulated by operating motor timer 54 and observing timer indicator 76 until said indicator shows that the selected control signals are being received at the proper interval in the proper sequence. Thereafter, all operation is automatic.

As synchronous motor 56 rotates continuously at constant speed, station sequence commutator 78 rotates; and as the moving arm of said commutator applies voltage sequentially to each segment, relays in station sequence relay amplifier 64 are energized sequentially. As contacts of said relays close in sequence, output signals from resolvers 42, 60 and 62 are fed through said contacts and resolver output amplifier 72 to phase comparator 34. At the same time, the output of phase comparator 34 from variable phase servo amplifier 70 is fed through said contacts to servo motors 48–52. By this means, station sequence relay amplifier 64 sequentially and periodically closes a comparator-motor-resolver-comparator servo loop to permit phase measurement between the selected reference control signal and the other selected control signals.

Operation of each said servo loop is identical. The resolver output operates a chopper in phase comparator 34 for comparing the phase of the resolver output with the phase of the selected control signal. During this interval an integrating capacitor, shown in FIGURE 7, stores the average voltage of the control signal while a chopper operated by the reference signal derived from frequency divider 26 through fixed phase servo amplifier 46 converts the stored voltage to A.C. at the reference signal frequency and provides an output from phase comparator 34 that is fed by variable phase servo amplifier 70 to a servo motor. The shaft of the servo motor and the rotor of the mechanically connected resolver then rotate until the resolver output signal and the selected control signal are 90 degrees out of phase, thus reducing phase comparator 34 output to zero and stopping servo motor rotation. Thereafter if the said 90 degree phase relationship changes during the same or a subsequent identical periodic interval, the servo motor again rotates, the direction of rotation being dependent on the direction of phase change, until the 90 degree phase relationship is restored.

Reference resolver 42 and reference servo motor 48 establish a zero phase reference by combining the locally generated reference signal with the selected reference control signal. The selected reference control signal drives reference servo motor 48. The locally generated reference signal from resolver amplifier 40 excites reference resolver 42. When the output of resolver 42 is 90 degrees out of phase with the selected reference control signal, said output fed through resolver amplifier 58 to resolvers 60 and 62 serves as the zero phase reference for phase measurement of the selected control signals relative to the selected reference control signal. Phase difference is indicated by digital counters 90 and 96, while continuous phase deviations are recorded by graph recorders 92 and 98.

To keep the reference resolver-comparator-motor servo loop locked in the 90 degrees out of phase relationship, automatic frequency control circuit 86 forms an additional closed servo loop paralleling the loop described above to compensate for minor changes in phase or frequency of the locally generated reference signal and the selected reference control signal. In the 90 degree phase condition previously described, shaft 88 is stopped at the zero phase reference position for phase measurement. If shaft 88 then rotates, a tuning voltage is applied by automatic frequency control circuit 86 to change the frequency of oscillator 20 in a direction that restores the 90 degree phase relationship and returns shaft 88 to the zero phase reference position. Thus automatic frequency control circuit 86 stabilizes shaft 88 at the zero phase reference position.

Figure 7:
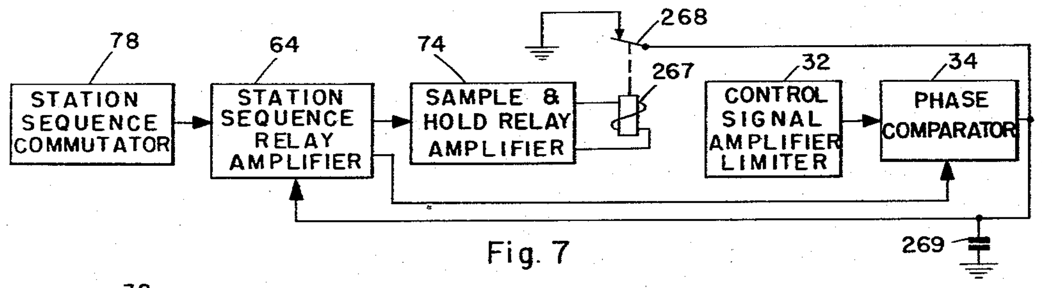
FIGURE 7 is a schematic and block diagram of the sample and hold circuit.

Sample and hold relay amplifier 74 provides means for sampling the stored signal and providing an output from phase comparator 34 during each periodic interval so that the output is an accurate indication of the phase of the stored signal. Between periodic intervals sample and hold relay amplifier 74 prepares and holds phase comparator 34 in readiness for receiving and storing a control signal during the next periodic interval. Sample and hold relay amplifier is illustrated in FIGURE 7 and described in detail hereinafter.

Assuming the receiver as thus described is installed in a moving vehicle and counters 90 and 96 are initially set according to a known position relative to the sources of said input signals, it is apparent that counters 90 and 96 thereafter provide continuous relative phase data for fixing and tracking a changing position.

*Detailed description*

Figure 2:
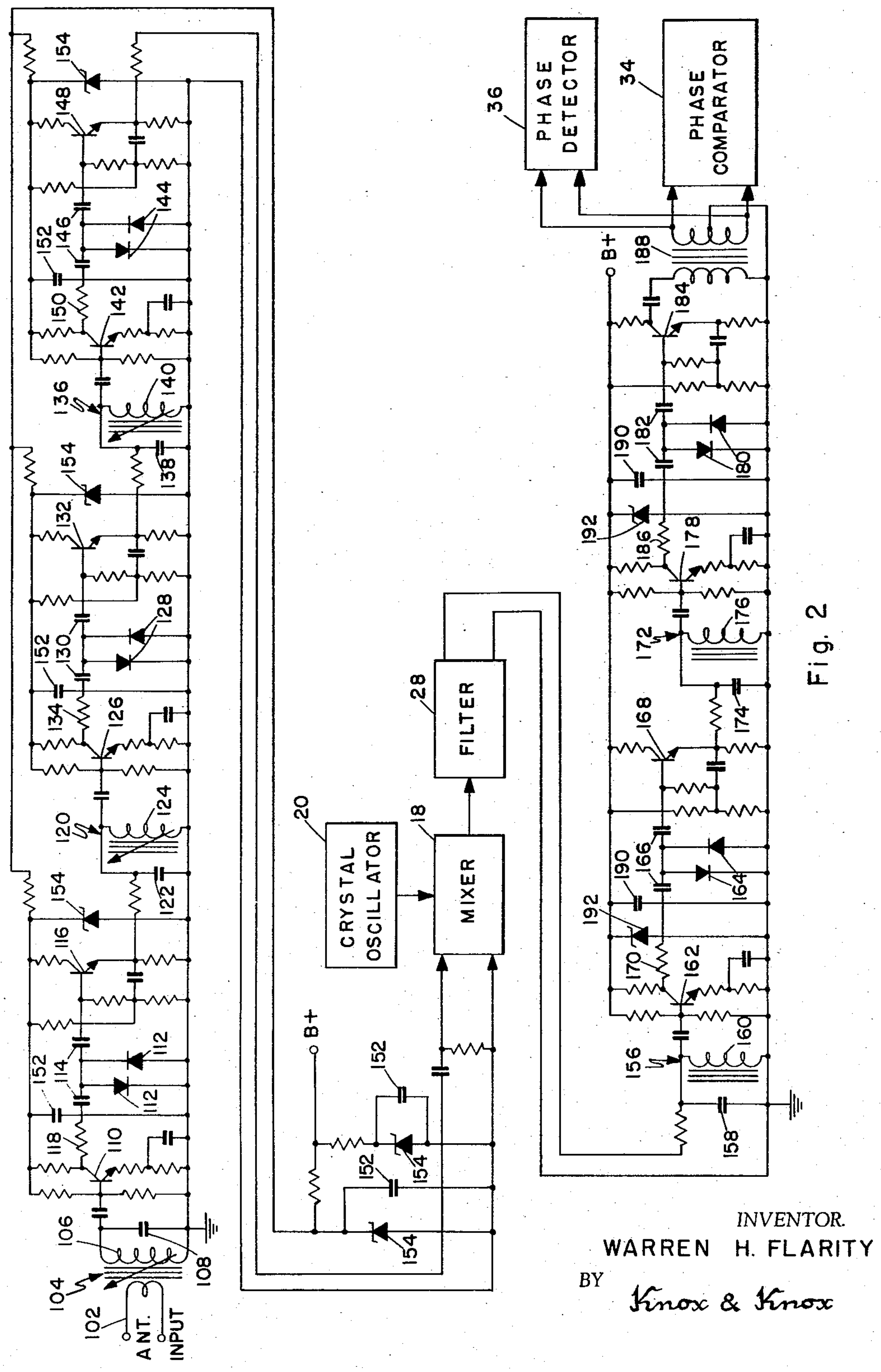
FIGURE 2 is a schematic diagram of the amplifier limiter portion and block diagram of other portions of the receiver.

The amplifier-limiter stages 12–16, 30 and 32 of FIGURE 1 are shown schematically in FIGURE 2. Partially illustrated transmission line 102 couples all input signals received by the antenna to a tuned circuit 104, comprising variable inductor 106 and capacitor 108 in the first stage. Circuit 104 is tuned to the frequency of the desired input signals, all other signals being bypassed to ground. Transistor 110 is biased for best low noise operation so that this first stage contributes only a small amount of noise while amplifying the incoming signals. Limiting diodes 112 clip the positive and negative peaks of static bursts, other externally generated noise, and strong input signals. Capacitors 114 isolate diodes 112 from D.C. and couple the output of transistor 110 to the input of transistor 116. The resistance of resistor 118 is made high relative to the nonlinear resistance of diodes 112, thus making negligible the nonlinear phase shift through diodes 112 and assuring that all phase shifts in the circuit are applied equally to all input signals. Transistor 116 is connected as an emitter-follower to provide an impedance match between the first and second stages.

In the second stage, tuned circuit 120, comprising capacitor 122 and variable inductor 124, is tuned to the same frequency as tuned circuit 104, coupling the output of the first stage to the input of the second stage and providing a narrower bandwidth than circuit 104 due to the amplification and limiting in the first stage. Transistor 126 is biased for maximum gain to raise weak input signals to the limiting level. Diodes 128, capacitors 130, transistor 132, and resistor 134 perform the same function as similar elements 112–118 in the first stage, diodes 128 limiting at the same level as diodes 112.

In the third stage, tuned circuit 136, comprising capacitor 138 and variable inductor 140, is tuned to the same frequency as circuits 104 and 120, coupling the second and third stages and providing a still narrower bandwidth due to progressive amplification and limiting. Transistor 142 is biased for maximum gain to ensure that all weak input signals are raised to the limiting level. Diodes 144, capacitors 146, transistor 148, and resistor 150 perform the same function as similar elements 112–118 in the first stage and 128–174 in the second stage, all diodes 112, 128, and 144 limiting at the same level to ensure that all signals are fed to mixer 18 at equal amplitude. Also, as previously described, nonlinear phase variations that might be caused by circuitry are eliminated so that all input signals fed to mixer 18 have the same relative phase difference between signals as received from transmission line 102. Limiting in each stage also suppresses sustained oscillations in the tuned circuits and prevents ringing.

Capacitors 152 and zener diodes 154 provide filtering and voltage regulation for the separate stages and the entire power supply. The unlabeled resistors and capacitors associated with each transistor 110, 116, 126, 132, 142, and 148 establish a temperature compensated stable bias for each transistor, thus eliminating nonlinear phase shifting that otherwise might be caused by varying temperature and supply voltage.

Input signals fed to mixer 18 are heterodyned with a signal from crystal oscillator 20, and the output of mixer 18 is fed to filter 28. Filter 28 eliminates all frequencies except the difference frequency between the input signals and the oscillator signal, and feeds the difference signal as a control signal to tuned circuit 156 in the first control signal amplifier-limiter stage.

Tuned circuit 156, comprising capacitor 158 and inductor 160, is tuned to the control signal frequency at a narrow bandwidth. Transistor 162 is biased for high gain to amplify the control signals toward a suitable level for driving servo motors. Diodes 164, capacitors 166, transistor 168, and resistor 170 perform the same functions as previously described.

Tuned circuit 172, comprising capacitor 174 and inductor 176, is tuned to the same frequency as circuit 156 at a narrower bandwidth. Transistor 178 further amplifies the control signals to ensure that they are at the desired level. Diodes 180, capacitors 182, transistor 184, and resistor 186 function the same as similar elements 164–170 at the same limiting level. The output of transistor 184 is fed to transformer 188 and from there to phase comparator 34 and phase detector 36.

Capacitors 190 and zener diodes 192 provide filtering and voltage regulation for each stage. The unlabeled resistors and capacitors associated with each transistor perform the same function as previously described. Control signals fed to comparator 34 and detector 36, due to progressive amplification and limiting and elimination of nonlinear phase variations in the manner described, are equal in amplitude and have the same relative phase difference as the input signals received from transmission line 102.

Figure 3:
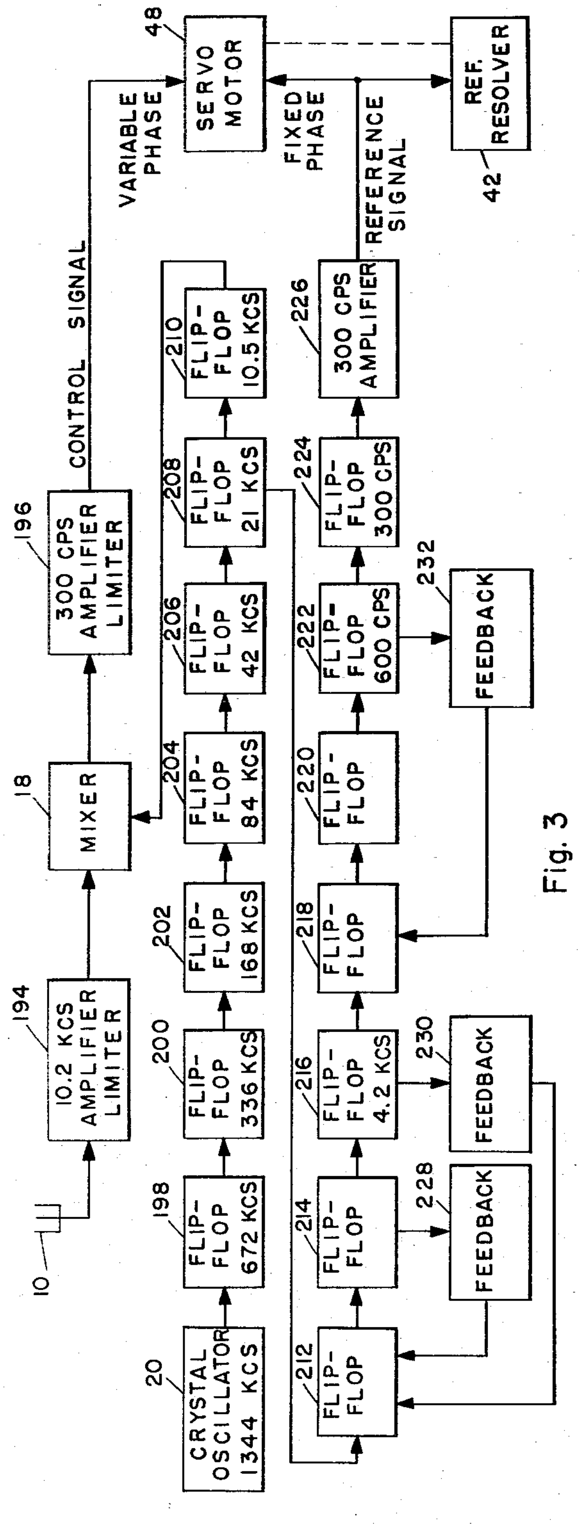
FIGURE 3 is a functional block diagram of the local oscillator, reference signal, and control signal portions of the receiver system.

One of the novel features of the instant invention is illustrated in FIGURE 3 wherein a single oscillator and frequency division means provide a reference signal and a beat signal at different frequencies, the beat signal and input signals producing control signals at the same frequency as the reference signal; the control and reference signals then being suitable for driving and exciting servo mechanisms. In FIGURE 3, amplifier-limiters 194 and 196 correspond to similar elements 12–16, 30 and 32 in FIGURE 1 and described in detail relative to FIGURE 2.

Crystal oscillator 20 operates at the frequency shown, the frequency having been selected in a medium range in which crystals inherently provide stable oscillations. Other frequencies, of course, could be selected. To provide maximum stability, oscillator 20 also is provided with a regulated power supply and enclosed in a heated, constant temperature cabinet, neither of which are shown. Temperature compensated stable oscillators may also be used.

To convert the output of oscillator 20 to lower frequency signals, flip-flops 198–210 successively divide the output by two until the output of flip-flop 210 is at a frequency that heterodynes with an input signal to mixer 18 from amplifier-limiter 194 to produce control signals of desired frequency in the output of amplifier-limiter 196. The output of flip-flop 208 is further divided by five in flip-flops 212–216, by seven in flip-flops 218–222, and by two in flip-flop 224 to produce in the output of amplifier 226 a reference signal at the same frequency as said control signals. Division by five and seven is accomplished by said flip-flops and feedback circuits 228–232, which feed back the outputs as shown to control the operating frequency of the flip-flops, this technique being well known in the art. Other frequency division techniques, such as integration, may be used.

The reference signal output of amplifier 226 and the control signal output of amplifier-limiter 196 drive two-phase servo motor 48 and the reference signal further excites reference resolver 42 in the manner and for the purpose described elsewhere herein.

Thus in a novel combination comprising a beat signal and a reference signal produced by a single oscillator, the instant invention combines the beat signal with input signals to produce control signals, combines the reference signal and the control signals at the same frequency to drive a servo motor, and further combines the reference signal to establish a resolver reference output signal.

Figure 4:
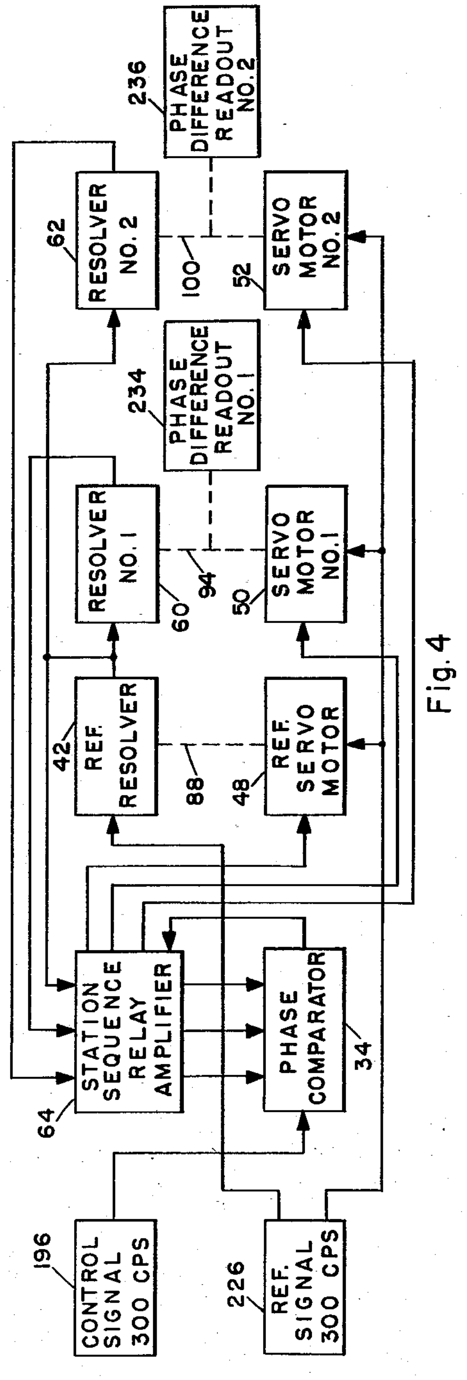
FIGURE 4 is a functional block diagram of the phase measuring portions of the receiver system.

FIGURE 4 illustrates the phase measurement circuitry of FIGURE 1 and shows how the reference signal and control signals generated in FIGURE 3 are used for phase measurement.

Control signals are fed sequentially at periodic intervals from control signal amplifier-limiter 196 to phase comparator 34. Reference signals are fed continuously from reference signal amplifier 226 to one phase of two-phase servo motors 48–52 and to the rotor of reference resolver 42. The stator output of reference resolver 42 is fed continuously to the rotors of resolvers 60 and 62. Said servo motors and said resolvers are connected mechanically by shafts 88, 94 and 100. As hereinafter described and illustrated in FIGURE 6, station sequence relay amplifier 64 sequentially and at periodic intervals connects the stator outputs of resolvers 42, 60, and 62 to phase comparator 34 and the output of phase comparator 34 to the other phase of two phase servo motors 48–52, these periodic intervals coinciding with the sequential, periodic intervals during which said control signals are received.

Initially, shafts 88, 94, and 100 are aligned so that when the output of reference resolver, 42 is 90 degrees out of phase with a selected reference control signal input to phase comparator 34, shaft 88 is at the zero phase position and when the outputs of resolvers 60 and 62 are 90 degrees out of phase with the output of reference resolver 42, shafts 94 and 100 are at the zero phase position. Thus the zero phase position of shafts 94 and 100 corresponds to zero phase of the selected reference control signal, and other positions of shafts 94 and 100 represent an angular difference between said positions and the zero position of shaft 88, said angular difference also being a measure of phase difference between said selected reference control signal and other control signals as hereinafter described.

As station sequence relay amplifier 64 connects the output of reference resolver 42 to phase comparator 34 and the output of phase comparator 34 to reference servo motor 48 coincidentally with reception of the selected reference control signal, said servo motor rotates shaft 88 and the rotor of resolver 42, thus varying the phase of the resolver 42 output signal. When the output of resolver 42 is 90 degrees out of phase with the selected reference control signal, the output of phase comparator 34 falls to zero and shaft 88 stops rotating. At this point, shaft 88 is at the zero phase position, and the output of reference resolver 42 becomes the reference phase for subsequent phase measurements.

Next in sequence, as station sequence relay amplifier 64 connects the output of No. 1 resolver 60 to phase comparator 34 and the output of phase comparator 34 to No. 1 servo motor 50 coincidentally with reception of the selected No. 1 control signal, said motor rotates shaft 94 and the rotor of resolver 60, thus varying the phase of the resolver 60 output signal. When the output of resolver 60 is 90 degrees out of phase with the selected No. 1 control signal, the output of phase comparator 34 falls to zero and shaft 94 stops rotating. At this point, shaft 94 is at the zero phase position provided the selected reference control signal and the selected No. 1 control signal are in phase or at some other position if said signals are out of phase. This phase equality or difference is shown visually by No. 1 phase difference readout device 234, which is connected mechanically to shaft 94. Device 234 may be a digital counter or other device designed to indicate phase in degrees or other variable dependent on phase.

No. 2 servo motor 52, No. 2 resolver 62, shaft 100, and No. 2 phase difference readout device 236 measure the phase of a selected No. 2 control signal in the same manner as described for selected No. 1 control signal. Phase measurement of additional selected control signals may be accomplished by adding duplicate circuitry as described.

Figure 5:
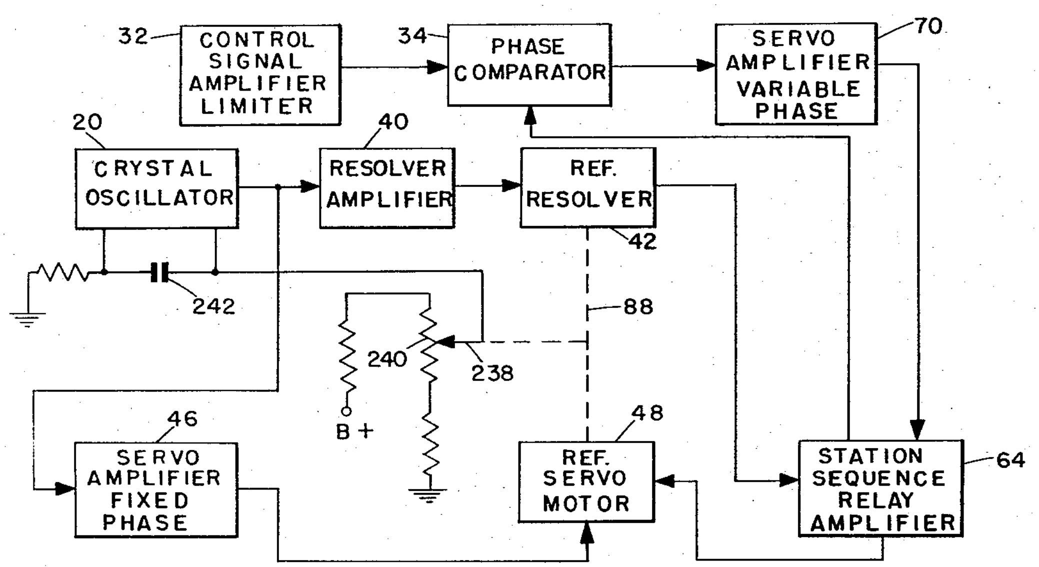
FIGURE 5 is a schematic and block diagram of the automatic frequency control circuit.

To ensure that the selected reference control signal and the output of reference resolver 42 remain exactly 90 degrees out of phase to maintain shaft 88 at the zero phase position, automatic frequency control voltages that are dependent on shaft 88 position are used to apply a fine tuning control to crystal oscillator 20. The automatic frequency control circuit 86 and associated circuitry of FIGURE 1 are shown in detail in FIGURE 5.

Moving arm 238 of potentiometer 240 is connected mechanically to shaft 88, potentiometer 240 being connected across a DC source and further connected through moving arm 238 across tuning capacitor 242 in crystal oscillator 20. Thus when shaft 88 rotates, moving arm 238 varies a tuning voltage applied to capacitor 242 and varies the frequency of oscillator 20. Initially when the frequency of oscillator 20 is adjusted to produce control and reference signal frequencies as shown in FIGURE 3, shaft 88 is at the zero phase position and the voltage applied to capacitor 242 is the proper value to maintain oscillator 20 at the indicated frequency. Subsequently, if the frequency of oscillator 20 or the frequency of the selected input reference control signal changes or each is not exactly at the proper frequency, shaft 88 rotates and applies a tuning voltage to capacitor 242 that changes the frequency of oscillator 20 in a direction that causes shaft 88 to return to the zero phase position.

As previously described, a reference signal established by oscillator 20 is applied through resolver amplifier 40 to reference resolver 42 and through fixed phase servo amplifier 46 to reference servo motor 48. A control signal received from control signal amplifier-limiter 32 is selected as a reference control signal. Simultaneously, station sequence relay amplifier 64 applies the output of reference resolver 42 to phase comparator 34 for comparison with the selected reference control signal and applies the output of phase comparator 34 through variable phase servo amplifier 70 to reference servo motor 48. This circuitry with moving arm 238, potentiometer 240, and capacitor 242 establishes a closed servo loop in addition to the comparator-motor-resolver-comparator loop previously described.

Movement of shaft 88 from the zero phase position changes the frequency of oscillator 20. Changing the frequency of oscillator 20 changes the frequency of the refence signal and the selected reference control signal, thereby changing the phase relationship of the selected reference control signal and the output of reference resolver 42. The direction of the changes in phase relationship is such as to again establish the output of reference resolver 42 and the selected reference control signal at 90 degrees out of phase and to return shaft 88 to the zero phase position. Thus the automatic frequency control circuit translates phase changes into frequency changes and vice versa to keep shaft 88 locked at the zero phase position.

Station sequence relay amplifier 64 with associated circuitry of FIGURE 1 is shown in detail in FIGURE 6. This circuit serves two main functions. The relay contracts carry current that otherwise would reduce the useful life of station sequence commutator 78. The relay contacts also isolate the resolver outputs and the servo motor variable phase inputs. Additionally, amplifier 64 provides a convenient means for activating sample and hold relay amplifier 74 as illustrated in FIGURES 6 and 7 and to be described later.

As station sequence commutator 78 rotates at constant speed, a DC voltage, 243 is applied sequentially through commutator 78 and station selectors 80–84 to drive transistors 244–248 sequentially into conduction and energize relays 250–254 in sequence. Contacts 256 apply the output of variable phase servo amplifier 70 to reference servo motor 48, while contacts 258 apply the output of reference resolver 42 to resolver output amplifier 72. Contacts 260 and 262 perform the same function as contacts 256 and 258 for No. 1 servo motor 50 and No. 1 resolver 60. Contacts 264 and 266 perform the same function as contacts 256 and 258 for No. 2 servo motor 52 and No. 2 resolver 62. Thus station sequence relay amplifier 64 sequentially connects the output of said resolvers through resolver amplifier 72 to phase comparator 34 and the output of phase comparator 34 to said servo motors through variable phase servo amplifier 70. In addition, as each relay 250–254 is energized, sample and hold relay amplifier 74 is activated.

Referring to FIGURE 7, sample and hold relay amplifier 74 is activated as previously described by sequential signals from station sequence commutator 78 through station sequence relay amplifier 64, thus energizing relay 267 and opening contacts 268 simultaneously as amplifier 64 sequentially closes each servo loop. Capacitor 269 is an integrating capacitor that stores the average voltage of each input control signal as selected and compared with the resolver outputs. To ensure that capacitor 269 completely discharges between input control signals and does not retain a residual charge from each control signal to add to the average voltage of successive control signals, contacts 268 close to discharge capacitor 269 between received control signals and open to permit charging during the periodic reception intervals. Thus sample and hold relay amplifier 74 permits sampling each selected control signal; then restores and holds phase comparator 34 in readiness for the next control signal. This is another novel feature of the instant invention.

Apparatus suitable for use as a visual indicator in control signal timer indicator 76 of FIGURE 1 is illustrated in two embodiments in FIGURES 8 and 9.

Referring to FIGURE 8, disc 270 is divided into segments 271 and engaged mechanically with the shaft of synchronous motor 56. Segments 271 correspond in number and relative position to the segments of station sequence commutator 78 in FIGURE 1. Window 272 permits segments 271 to be observed as disc 270 rotates. Also observable in window 272 is a slit 273 and the light shining therethrough from lamp 274, which may be a gaseous glow tube or other suitable electric lamp. Control signals received from control signal amplifier-limiter 32 directly as shown or through phase detector 36 of FIGURE 1 are applied to lamp 274. Consequently when station sequence commutator 78 is timed as previously described to receive selected control signals at prescribed intervals in proper sequence, lamp 274 lights when a control signal is received coincidentally as the leading edge of a segment 271 rotates past slit 273 and goes out at the end of the control signal interval coincidentally as the trailing edge of said segment rotates past slit 273.

Operation of the apparatus illustrated in FIGURE 9 is similar to that of FIGURE 8. An elongated electroluminescent glow plate 276 is substituted for single lamp 274. Glow plate 276 is divided into segments 278 corresponding to segments 271. Although segments 278 are shown in a linear pattern, a circular pattern would also be suitable. Stationary electrode 280 extends along one edge of glow plate 276. Rotating electrode 282, engaged mechanically with the shaft of synchronous motor 56, takes the place of rotating disc 270. Conductors 284 connect a conductive portion adjacent each segment 278 to conductor segments 286, all elements being mounted on printed circuit board 288 as shown. Conductor segments 286 are elongated to permit rotating electrode 282 to rotate in contact with each conductor segment 286 in the same periodic interval during which a control signal is received.

Figure 10:
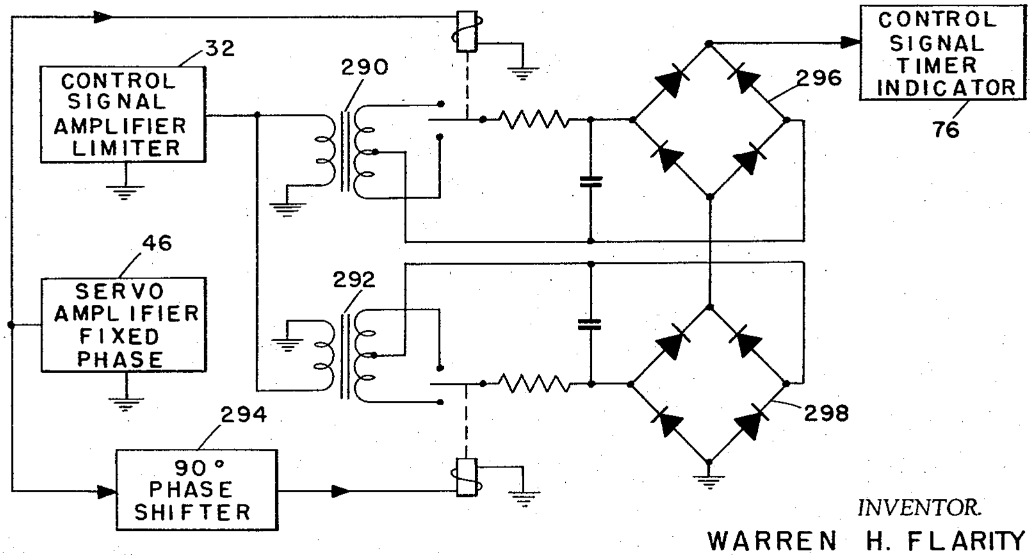
FIGURE 10 is a schematic and block diagram of a phase detector used to activate the visual indicators of FIGURES 8 and 9.

Control signal timer indicator 76 as illustrated in FIGURES 8 and 9 is a voltage operated device. Under normal conditions, therefore, indicator 76 may receive control signals directly from control signal amplifier limiter 32. When a control signal is not being received, however, the noise output of amplifier-limiter 32 might provide enough voltage to operate indicator 76. Under these conditions a phase detector 36 insensitive to noise voltages and providing an output only when signals having phase characteristics are present, may be connected between amplifier-limiter 32 and indicator 76 as shown in FIGURES 1 and 10. A novel phase detector having an output regardless of the phase difference between a reference signal and an input control signal and considred suitable for this purpose is illustrated in FIGURE 10.

Identical phase comparators 290 and 292 are connected to receive the same control signal from control signal amplifier-limiter 32. Additionally, both comparators 290 and 292 receive the locally generated reference signal from fixed phase servo amplifier 46. The reference signal to comparator 292, however, is shifted 90 degrees by 90 degree phase shifter 294. The output of each phase comparator 290 and 292 is maximum when the input control signal and reference signal are in phase and zero when said signals are 90 degrees out of phase. Thus, since the reference signal is in phase to comparator 290 and 90 degrees out of phase to comparator 292, the outputs of comparators 290 and 292 are 90 degrees out of phase, each providing maximum output when the output of the other is zero. The output of comparators 290 and 292 is converted to DC by bridge rectifiers 296 and 298. Rectifiers 296 and 298 are connected in series to combine the two outputs and provide a single output to control signal timer indicator 76.

From the foregoing general and detailed description it is apparent that the instant invention includes many unique features in a novel combination, all contributing to the technique of phase measurement in a manner previously unknown in the art.

It is understood that minor variation from the form of the invention disclosed herein may be made without departure from the spirit and scope of the invention, and that the specification and drawings are to be considered as merely illustrative rather than limiting.

I claim:

1. In a radio receiver, the combination comprising:
single frequency generating means for generating a beat signal at one frequency and a reference signal at another frequency;
means for receiving and amplifying a plurality of successively received, sequential input signals having the same frequency and different relative phases;
means for heterodyning said beat signal with said successive input signals and producing successive, sequential control signals therefrom having the same frequency as said reference signal; and
means for measuring the phase difference between one of said control signals and certain others of said successive, sequential control signals.

2. In a radio receiver, the combination comprising:
single frequency generating means for generating a beat signal at one frequency and a reference signal at another frequency;
amplifier limiter means for receiving a series of successively received, sequential and discrete input signals having the same frequency and different magnitude and phases and providing sequential limiter output signals having equal magnitudes with the same phase differences as corresponding ones of said input signals;
mixer means for heterodyning said beat signal with said sequential limiter output signals and producing successive and sequential control signals therefrom;
said control signals and said reference signal having the same frequency;
and means responsive to said reference signal for measuring the phase difference between one of said control signals and certain others of said control signals.

3. In a radio receiver, the combination comprising:
an electronic oscillator;
means for converting the output of said oscillator to a beat signal at one frequency and a reference signal at another frequency;
amplifier-limiter means for receiving a series of successively received, sequential and discrete input signals having the same frequency and different magnitudes and phases and providing sequential limiter output signals having equal magnitudes with the same phase differences as corresponding ones of said input signals;
mixer means for heterodyning said beat signal with said sucessive limiter output signals and producing successive and sequential control signals therefrom;
said control signals and said reference signal having the same frequency;
means for supplying said successive and sequential control signals and said reference signal to a phase comparator means;
said phase comparator means in response to said reference signal and to said successive and sequential control signals for generating a comparator signal having a magnitude proportional to the difference in phase between said control signals;
synchronizing means for maintaining said reference signal and one of said control signals 90 degrees out of phase thereby establishing said control signal as a reference control signal;
said synchronizing means having said reference signal and said reference control signal as inputs and providing a resolved control signal to said phase comparator means for synchronizing the phase of said reference signal and said reference control signal;
phase measuring means for measuring the phase difference between said reference control signal and other of said successive, sequential control signals; and
said phase measuring means having said reference signal, one of said control signals, and said resolved output signal as inputs and providing an output to said phase comparator means for measuring the relative phase of said reference control signal and certain others of said control signals.

4. The combination of claim 3 including means for selectively and sequentially connecting said phase comparator means to said synchronizing means coincidentally with reception of said reference control signal and to said phase measuring means coincidentally with reception of each of said successive, sequential control signals.

5. Apparatus according to claim 3 wherein said synchronizing means includes a servo motor driven resolver, said motor being driven by said reference signal and said reference control signal, the rotor of said resolver being connected to said reference signal, the stator of said resolver being connected to said phase compartor means.

6. Apparatus according to claim 3 wherein said phase measuring means includes a servo motor driven resolver, said motor being driven by said reference signal and one of said control signals, the rotor of said resolver being connected to said output of said synchronizing means, the stator of said resolver being connected to said phase comparator means.

7. The combination of claim 3 including automatic frequency control means adjusted by said synchronizing means and having an output connected to said electronic oscillator to maintain said oscillator at the exact frequency necessary for said reference signal and said reference control signal to be exactly 90 degrees out of phase.

8. Apparatus according to claim 7 wherein said automatic frequency control means includes a potentiometer connected across a DC source, said potentiometer having a moving arm actuated by said synchronizing means and connected to said electronic oscillator to apply a tuning voltage to said oscillator.

9. The combination of claim 3 including timer indicator means indicating when said reference signal and said reference control signal are 90 degrees out of phase and said control signals are being received in proper sequence, said timer indicator means being synchronized with said reference signal and receiving said reference control signal and said other control signals from said mixer means.

10. Apparatus according to claim 9 wherein said timer indicator means includes an electric lamp energized by said reference control signal and said other control signals, said lamp being mounted behind an elongated slit, a rotating disc synchronized with said reference signal, said disc having segments on the perimeter thereof, said segments rotating beneath said slit coincidentally with reception of said reference control signal and said other control signals.

11. Apparatus according to claim 9 wherein said timer indicator means includes an electroluminescent plate, a plurality of fixed electrodes, and a rotating arm, said arm being electrically positioned between said plate and said electrodes, rotation of said arm being synchronized with said reference signal, both said plate and said electrodes receiving said reference control signal when connected by said arm and said other control signals to cause a separate portion of said plate to become luminescent coincidentally with reception of each of said control signals.

12. The combination of claim 3 including phase indicating means for indicating the phase of each said control signals relative to said reference control signal, said phase indicating means being connected to said phase measuring means.

13. Apparatus according to claim 12 wherein said phase indicating means includes a digital counter capable of indicating phase difference in degrees and fractions of degrees.

14. The combination of claim 3 including phase detection means receiving said control signals from said mixer means, said phase detection means providing output signals regardless of the relative phase of said control signals and said reference signal.

15. Apparatus according to claim 14 wherein said phase detection means comprises:

a pair of phase comparators receiving said control signals and said said reference signal for comparison of said reference signal with said control signals, said reference signal being shifted 90 degrees in phase before reception by one of said phase comparators; and a pair of bridge rectifiers, each connected across the output of one of said phase comparators, said bridge rectifiers being connected in series to provide an output with single polarity.

References Cited

UNITED STATES PATENTS

| | | | |
|---|---|---|---|
| 2,811,716 | 10/1957 | Crist | 324—83 |
| 3,202,993 | 8/1965 | O'Brien | 343—105 |

KATHLEEN H. CLAFFY, *Primary Examiner.*

R. LINN, *Assistant Examiner.*